(12) United States Patent
Han et al.

(10) Patent No.: US 7,217,480 B2
(45) Date of Patent: May 15, 2007

(54) ORGANIC ELECTROLYTIC SOLUTION AND LITHIUM BATTERY USING THE SAME

(75) Inventors: Jae-il Han, Seoul (KR); Hyo-sug Lee, Gyeonggi do (KR); Han-soo Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 478 days.

(21) Appl. No.: 10/754,731

(22) Filed: Jan. 12, 2004

(65) Prior Publication Data
US 2004/0142246 A1    Jul. 22, 2004

(30) Foreign Application Priority Data
Jan. 14, 2003    (KR) ...................... 10-2003-0002377

(51) Int. Cl.
*H01M 10/40* (2006.01)
(52) U.S. Cl. ...................... 429/326; 429/329; 429/330; 429/331; 429/332
(58) Field of Classification Search ................. 429/324, 429/326, 329, 330, 331, 332, 341
See application file for complete search history.

(56) References Cited

U.S. PATENT DOCUMENTS

| | | | | |
|---|---|---|---|---|
| 4,678,585 A | * | 7/1987 | Brownrigg | 210/727 |
| 5,116,882 A | * | 5/1992 | Grey et al. | 521/147 |
| 5,352,548 A | | 10/1994 | Fujimoto et al. | 429/341 |
| 5,626,981 A | | 5/1997 | Simon et al. | 429/105 |
| 5,712,059 A | | 1/1998 | Barker et al. | 429/331 |
| 5,714,281 A | | 2/1998 | Naruse et al. | 429/332 |
| 6,096,447 A | * | 8/2000 | Gan et al. | 429/332 X |
| 6,114,070 A | | 9/2000 | Yoshida et al. | 429/332 |
| 6,132,901 A | * | 10/2000 | Clough | 429/347 X |
| 6,200,701 B1 | | 3/2001 | Gan et al. | 429/203 |

FOREIGN PATENT DOCUMENTS

| | | |
|---|---|---|
| JP | 10-223257 | 8/1998 |
| JP | 2001-176548 | 6/2001 |
| JP | 2001-217001 | 8/2001 |

* cited by examiner

*Primary Examiner*—Stephen J. Kalafut
(74) *Attorney, Agent, or Firm*—Stein, McEwen & Bui, LLP

(57) ABSTRACT

An organic electrolytic solution includes a lithium salt and an organic solvent containing a phosphonate compound, and a lithium battery utilizes the organic electrolytic solution. When using the organic electrolyte containing the phosphonate compound to manufacture a lithium secondary battery, the lithium secondary battery has improved stability to reduction-induced decomposition, reduced first cycle irreversible capacity, and improved charging/discharging efficiency and lifespan. In addition, the lithium secondary battery does not swell beyond a predetermined thickness range after formation and standard charging at room temperature and has improved reliability. Even when the lithium secondary battery swells seriously at a high temperature, its capacity is high enough for practical applications. The capacity of the lithium secondary battery may substantially be recovered after being left at a high temperature.

20 Claims, 7 Drawing Sheets

ORGANIC ELECTROLYTIC SOLUTION AND LITHIUM BATTERY USING THE SAME

CROSS-REFERENCE TO RELATED APPLICATIONS

This application claims the priority of Korean Patent Application No. 2003-2377, filed on Jan. 14, 2003, in the Korean Intellectual Property Office, the disclosure of which is incorporated herein in its entirety by reference.

BACKGROUND OF THE INVENTION

1. Field of the Invention

The present invention relates to an organic electrolytic solution and a lithium battery using the same, and more particularly, to an organic electrolytic solution to prevent batteries from swelling and to improve the reliability thereof, and a lithium battery using the organic electrolytic solution.

2. Description of the Related Art

As portable electronic devices, such as camcorders, mobile phones, notebook computers, and the like, become smaller and more lightweight while at the same time becoming functionally more powerful, considerable research is being conducted into batteries as a driving source for these portable devices. In particular, rechargeable lithium secondary batteries have three times greater energy densities per unit weight and higher charging rates relative to conventional lead batteries, nickel-cadmium (Ni—Cd) batteries, nickel-hydrogen batteries, nickel-zinc batteries, and the like. For these reasons, lithium secondary batteries have attracted greater attention, and intensive research thereinto has been conducted.

In lithium ion batteries, a lithium complex oxide such as $LiNiO_2$, $LiCoO_2$, $LiMn_2O_4$, $LiFePO_4$, $LiNixCo_{1-x}O_2$, $Ni_{1-x-y}Co_xMn_yO_2$ or the like, is used as cathode active materials, and lithium metal, lithium metal alloys, carbonaceous materials, graphitic materials, etc., are used as anode active materials. There are two types of electrolyte: liquid electrolyte and solid electrolyte. The use of liquid electrolyte raises safety concerns, such as a risk of fire and explosion of batteries due to evaporation of the liquid electrolyte. To address these problems, using solid electrolytes instead of liquid electrolytes has been suggested. Solid electrolytes are unlikely to suffer from leakage and are easy to process. Due to these advantages of the solid electrolyte, intensive research into such a solid electrolyte, particularly, a polymer solid electrolyte, is currently being undertaken. Existing polymer solid electrolytes may be classified into a full solid electrolyte and a gel electrolyte containing an organic electrolytic solution.

General lithium batteries operate at a high working voltage and are incompatible with conventional aqueous electrolytic solution. The most probable reason for this is that their lithium anode reacts vigorously with the aqueous solvent of the electrolyte. Accordingly, organic electrolytic solutions containing a lithium salt in an organic solvent are used in lithium batteries. An efficient organic solvent for organic electrolytic solutions has greater ionic conductivity, larger dielectric constant, and lower viscosity. However, these requirements cannot be fully satisfied with a single organic solvent, so that a mixture of a high dielectric constant organic solvent and a low dielectric constant organic solvent, a mixture of a high dielectric constant organic solvent and a low viscosity organic solvent, and the like, have been used.

U.S. Pat. No. 6,114,070 and No. 6,048,637 disclose the use of a solvent mixture of a linear carbonate and a cyclic carbonate, for example, a mixture of dimethyl carbonate or diethyl carbonate and ethylene carbonate or propylene carbonate, to improve the ionic conductivity of the organic solvent. However, such solvent mixtures may be used only at 120° C. or less. If the temperature is higher, the solvent mixture vaporizes and the battery swells due to the gas generated from the solvent mixture.

U.S. Pat. No. 5,352,548, No. 5,712,059, and No. 5,714,281 disclose the use of 20% or greater of vinylene carbonate as a main solvent. However, vinylene carbonate has a lower dielectric constant than ethylene carbonate, propylene carbonate, and γ-butyrolactone and leads to considerably poor charge/discharge and high-rate characteristics when used as a main solvent in batteries.

U.S. Pat. No. 5,626,981 discloses the formation of a surface electrolyte interface (SEI) on the surface of a cathode during initial charging/discharging by using a vinylene carbonate-added electrolytic solution. Japanese Laid-open Patent Application No. 2001-217001 discloses an effective non-aqueous electrolytic solution containing a phosphagen derivative that is nonflammable and provides good low temperature characteristics and interfacial resistance characteristics. Japanese Laid-open Patent Application No. 2001-176548 discloses the use of sulfuric ester as an additive to minimize the first cycle irreversible capacity of a lithium ion battery and to maintain a low temperature cycling capacity.

However, when the batteries in the above-described patents remain at a high temperature, the batteries swell beyond an allowable thickness limit such that their cases deform and cannot be used any longer.

Japanese Laid-open Patent Publication No. hei 10-223257 discloses the use of a nonflammable electrolytic solvent containing phosphite ester having the formula of $(R_1O)P(=O)(OR_2)(R_3)$ where $R_1$, $R_2$, and $R_3$ are $C_1$–$C_4$ alkyl, to improve electrical conductivity and reduce reductive decomposition for the improved charge/discharge efficiency, and lifespan of batteries.

U.S. Pat. No. 6,200,701 discloses the use of phosphite ester having the formula of $(R_1O)P(=O)(OR_2)(R_3)$, where $R_3$ is a hydrogen atom, and at least one of $R_1$ and $R_2$ is a hydrogen atom or a saturated $C_1$–$C_{13}$ organic compound, to improve the charging/discharging efficiency, lifespan, and first cycle irreversible capacity of batteries.

SUMMARY OF THE INVENTION

The present invention provides an organic electrolytic solution to suppress the swelling of a battery effectively during initial charging and multiple cycles of charging/discharging and to improve the reliability of the battery. The present invention also provides a lithium battery that utilizes the organic electrolytic solution.

In accordance with an aspect of the present invention, an organic electrolytic solution includes a lithium salt and an organic solvent comprising a phosphonate compound of formula (1) below:

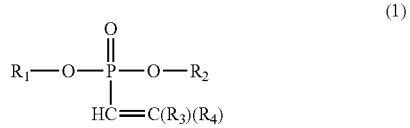

wherein $R_1$ and $R_2$ are independently selected from among a substituted or unsubstituted $C_1$–$C_{20}$ alkyl group, a substituted or unsubstituted $C_1$–$C_{20}$ alkoxy group, a substituted or unsubstituted $C_2$–$C_{20}$ alkenyl group, a substituted or unsubstituted $C_6$–$C_{30}$ aryl group, a substituted or unsubstituted $C_7$–$C_{30}$ aralkyl group, a substituted or unsubstituted aryloxy group, a substituted or unsubstituted $C_2$–$C_{30}$ heteroaryl group, a substituted or unsubstituted $C_3$–$C_{30}$ heteroaralkyl group, a substituted or unsubstituted $C_2$–$C_{30}$ heteroaryloxy group, a substituted or unsubstituted $C_5$–$C_{20}$ cycloalkyl group, and a substituted or unsubstituted $C_2$–$C_{20}$ heterocycloalkyl group; and $R_3$ and $R_4$ are independently selected from among a hydrogen atom and a substituted or unsubstituted $C_1$–$C_{20}$ alkyl group.

In accordance with another aspect of the present invention, a lithium battery includes a cathode, an anode, a separator interposed between the cathode and the anode, and the above-described organic electrolytic solution.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
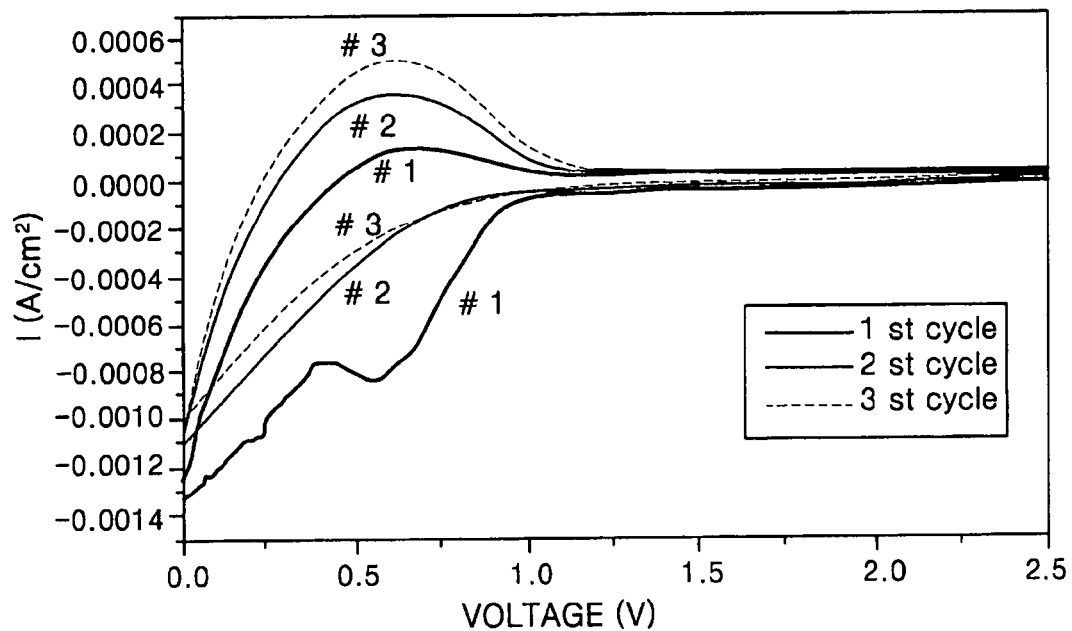
FIGS. 1 through 7 are graphical representations of electrical characteristics for batteries of Examples 1 through 7, which were measured using cyclic voltammetry (CV)
Figure 2:
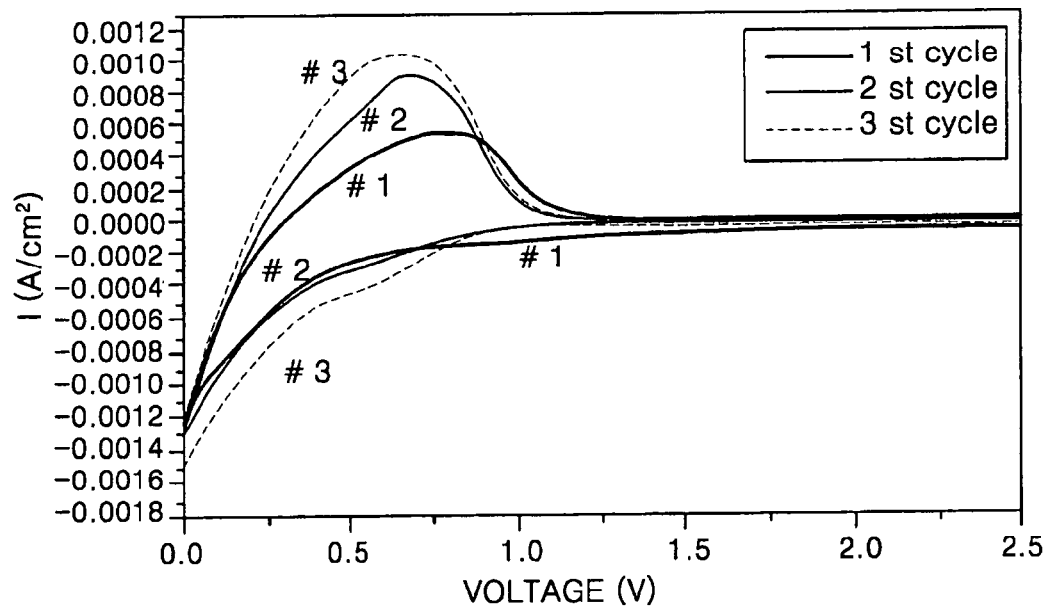
Figure 3:
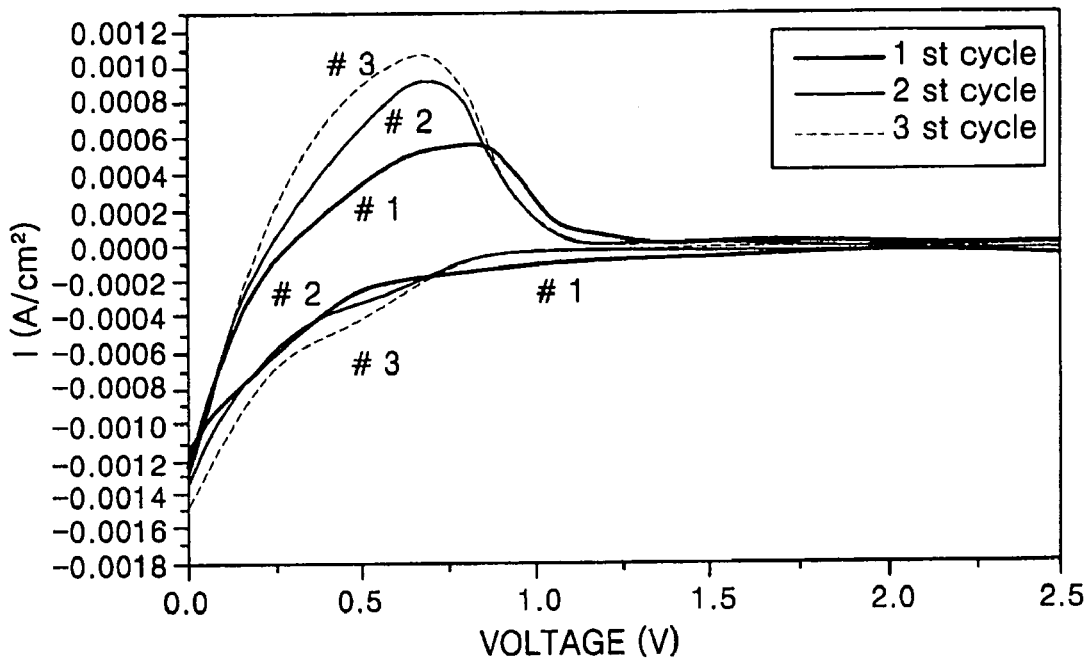
Figure 4:
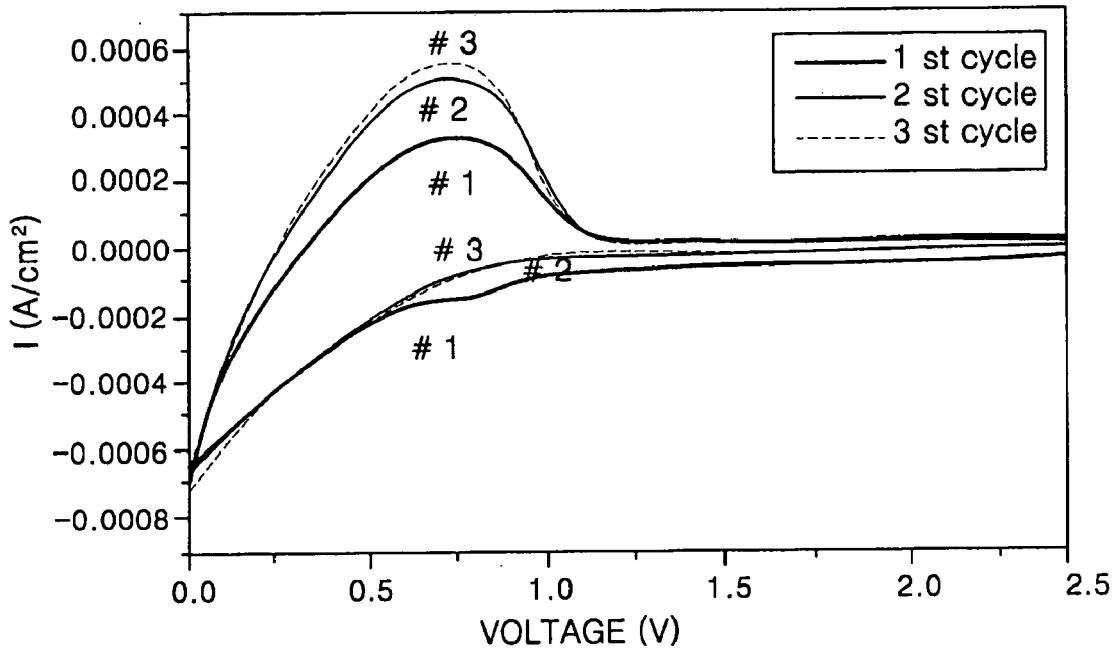

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention is directed to the formation of a solid electrolyte interface film on the surface of an anode using an organic electrolytic solution containing a phosphonate compound of formula (1) below to effectively suppress the swelling of a battery without a reduction in ionic conductivity.

The phosphonate compound of formula (1) below is liquid at room temperature, and has similar physical properties to ethylene carbonate or propylene carbonate so that it scarcely raises pressure inside the battery caused by vaporization at high temperature.

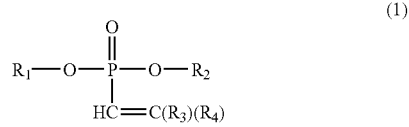

In formula (1) above, $R_1$ and $R_2$ are independently selected from among a substituted or unsubstituted $C_1$–$C_{20}$ alkyl group, a substituted or unsubstituted $C_1$–$C_{20}$ alkoxy group, a substituted or unsubstituted $C_2$–$C_{20}$ alkenyl group, a substituted or unsubstituted $C_6$–$C_{30}$ aryl group, a substituted or unsubstituted $C_7$–$C_{30}$ aralkyl group, a substituted or unsubstituted aryloxy group, a substituted or unsubstituted $C_2$–$C_{30}$ heteroaryl group, a substituted or unsubstituted $C_3$–$C_{30}$ heteroaralkyl group, a substituted or unsubstituted $C_2$–$C_{30}$ heteroaryloxy group, a substituted or unsubstituted $C_5$–$C_{20}$ cycloalkyl group, and a substituted or unsubstituted $C_2$–$C_{20}$ heterocycloalkyl group; and $R_3$ and $R_4$ are independently selected from among a hydrogen atom and a substituted or unsubstituted $C_1$–$C_{20}$ alkyl group.

Generally, the phosphonate compound is diethyl vinyl phosphonate ($H_2C=CHP(=O)(OC_2H_5)_2$: DEVP) or dimethyl vinyl phosphonate ($H_2C=CHP(=O)(OCH_3)_2$: DEVP).

The amount of the phosphonate compound of formula (1) above is preferably in a range of 0.1–50% by weight, and more preferably, in a range of 1–5% by weight, with respect to 50–99.9% by weight of the organic electrolytic solution. If the amount of the phosphonate compound does not lie within the above range, the effect of suppressing the swelling of the battery is trivial, and charging/discharging characteristics become poor.

The organic solvent according to the present invention includes a high dielectric constant solvent and a low boiling point solvent. Suitable examples of the high dielectric constant solvent include cyclic carbonates, such as ethylene carbonate, propylene carbonate, butylene carbonate, and γ-butyrolactone. Suitable examples of the low boiling point solvent include dimethyl carbonate, ethyl methyl carbonate, diethyl carbonate, dipropyl carbonate, dimethoxyethane, a $C_1$–$C_{13}$ fatty acid ester derivative, and the like.

The high dielectric constant solvent and the low boiling point solvent are mixed, preferably, in a ratio of 10:90–90:10 by volume, and more preferably, in a ratio of 40:60–50:50 by volume. If the volumetric ratio of the low boiling point solvent to the high dielectric constant solvent does not lie within the above range, ionic conductivity deteriorates.

In the organic electrolyte solution according to the present invention, any lithium salt commonly used in the field may be used. For example, at least one selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$), and lithium bistrifluoromethansulfonylamide ($LiN(CF_3SO_2)_2$) may be used as the lithium salt. It is preferable that the concentration of lithium salt is in a range of 0.5–2.0 M. If the concentration of lithium salt is less than 0.5 M, ionic conductivity is low.

If the concentration of lithium salt exceeds 2.0 M, one obtains the undesirable effect that the lithium salt is more likely to decompose.

Specific examples of an unsubstituted $C_1$–$C_{20}$ alkyl group as a substituent for the compound of formula (1) above include a methyl group, an ethyl group, a propyl group, an isobutyl group, a sec-butyl group, a pentyl group, an iso-amyl group, a hexyl group, etc., wherein at least one hydrogen atom of the alkyl group may be substituted with a halogen atom, halide, a lower alkyl group, an alkoxy group, a hydroxy group, a nitro group, a cyano group, an amino group, an amidino group, hydrazine, hydrazone, a carboxy group, a sulfonic acid group, a phosphoric acid group, etc.

Specific examples of an unsubstituted $C_1$–$C_{20}$ alkoxy group as a substituent for the compound of formula (1) above include a methoxy group, an ethoxy group, a propoxy group, an isobutyl group, a sec-butyloxy group, a pentyloxy group, an iso-amyloxy group, a hexyloxy group, etc, wherein at least one hydrogen atom of the alkoxy group may be substituted with any substitute group described above as being suitable for the $C_1$–$C_{20}$ alkyl group.

The aryl group as a substituent for the compound of formula (1) above refers to a $C_6$–$C_{30}$ carbocyclic aromatic system containing at least one ring wherein such rings may be attached together in a pendent manner or may be fused. Examples of such an aryl group include phenyl, naphthyl, tetrahydronaphthyl, and the like, wherein at least one hydrogen atom of the aryl group may be substituted with any substitute group described above as being suitable for the $C_1$–$C_{20}$ alkyl group.

The aralkyl group as a substitutuent for the compound of formula (1) above refers to the above-defined aryl group having lower alkyl substitute groups, for example, methyl, ethyl, propyl, and the like for some hydrogen atoms. Examples of an aralkyl group include benzyl, phenylethyl, etc. At least one hydrogen atom of the aralkyl group may be substituted, with any substitute group described above as being suitable for the $C_1$–$C_{20}$ alkyl group.

The heteroaryl group as a substitutent for the compound of formula (1) above refers to a carbocyclic system containing one, two, or three hetero atoms selected from the group consisting of N, O, P, and S, wherein the carbocyclic system may be monocyclic or may include fused rings.

The heteroaralkyl group as a substituent for the compound of formula (1) above refers to the above-defined heteroaryl group having lower alkyl substitute groups for some hydrogen atoms, wherein at least one hydrogen atom of the heteroaralkyl group may be substituted with any substitute group described above as being suitable for the $C_1$–$C_{20}$ alkyl group.

The cycloalkyl group as a substitutent for the compound of formula (1) above refers to a $C_5$–$C_{20}$ cyclic system, wherein at least one hydrogen atom of the cycloalkyl group may be substituted with any substitute group described above as being suitable for the $C_1$–$C_{20}$ alkyl group.

The heterocycloalkyl group as a substituent for the compound of formula (1) above refers to a carbocyclic system containing one, two, or three hetero atoms selected from the group consisting of N, O, P, and S, wherein at least one hydrogen atom of the heterocycloalkyl group may be substituted with any substitute group described above as being suitable for the $C_1$–$C_{20}$ alkyl group.

A lithium battery using the electrolytic solution according to the present invention may have any suitable shape. A method of manufacturing a lithium battery according to the present invention will be described.

First, a cathode active material, a conducting agent, a binder, and a solvent are mixed together to prepare a cathode active material composition. This cathode active material composition is directly coated on an aluminum current collector and dried to form a cathode plate. Alternatively, the cathode plate may be manufactured by laminating an aluminum current collector with a cathode active material film that is previously formed by casting the cathode active material composition on a support and then separated therefrom.

At least one selected from the group consisting of lithium-containing metal oxides, lithium composite oxides, such as $LiCoO_2$, $LiMn_xO_{2x}$, $LiNi_{1-x}Mn_xO_{2x}$ where x=1 or 2, and $Ni_{1-x-y}Co_xMn_yO_2$, simple substance sulfur, kasolite containing $Li_2S_n$ where $n \geq 1$, organo-sulfur, and $(C_2S_x)_y$ where x ranges from 2.5 to 20 and $y \geq 2$ may be used for the cathode active material. Carbon black may be used for the conducting agent. Examples of the binder include a vinylidenefluoride-hexafluoropropylene copolymer, polyvinylidenefluoride, polyacrylonitrile, polymethymethacrylate, polytetrafluoroethylene, styrene-butadiene copolymer rubbers or the mixture thereof. N-methylpyrrolidone, acetone, water, and the like may be used for the solvent of the cathode active material composition. The amounts of active cathode material, conducting agent, binder, and solvent in the cathode active material composition are determined in accordance with general levels for lithium batteries.

In a similar manner applied to manufacture the cathode plate, an anode active material, a conducting agent, a binder, and a solvent are mixed to prepare an anode active material composition. A copper current collector is directly coated with the anode active material composition or is laminated with an anode active material film that is previously formed by casting the anode active material composition on a support and then separated therefrom, to manufacture an anode plate. Lithium metal, a lithium alloy, a carbonaceous material, or graphite (natural or artificial graphite) may be used for the anode active material. In addition, the above-listed examples of a conducting agent, a binder, and a solvent for the cathode active material composition may be used for the anode active material composition. In one embodiment, a plasticizing agent may be further added into each of the cathode and anode active material compositions to form porous cathode and anode plates.

Meanwhile, any separator commonly used in the manufacture of lithium batteries may be used for a lithium battery according to the present invention. However, preferred materials for the separator allow ions included in the electrolytic solution to migrate smoothly and have the ability to retain a larger amount of electrolytic solution. Specific examples of such separator materials include a glass fiber, polyester, Teflon, polyethylene, polypropylene, polytetrafluoroethylene (PTEE), and a combination of the foregoing materials, which may be in non-woven fabric or woven fabric form. In particular, a separator made of polyethylene, polypropylene, and the like, which may be rolled, is used for a lithium ion battery, and a separator that may retain a larger amount of organic electrolytic solution is used for a lithium ion polymer battery. These separators may be manufactured as follows.

First, a polymer resin, a filling agent, and a solvent are mixed together to prepare a separator composition. This separator composition is directly coated on an electrode and dried to form a separator. Alternatively, the separator may be formed by laminating the electrode with a separator film, which is previously formed by casting the separator composition on a support and drying.

Any polymer resin that may be used as a binder for electrode plates may be used without limitations. Examples of the polymer resin include a polyvinylidenefluoride-hexafluoropropylene copolymer, polyvinylidenefluoride, polyacrylonitrile, polymethacrylate, and a mixture of the foregoing materials. A preferred polymer resin is a vinylidenefluoride-hexafluoropropylene copolymer containing 8–25% by weight of hexafluoropropylene.

The separator is disposed between the cathode plate and anode plate manufactured as described above to form an electrode assembly. This electrode assembly is rolled or folded and then sealed in a battery case. If necessary, the electrode assembly is pressed before sealing.

Next, the organic electrolytic solution according to the present invention is injected into the battery case so that a complete lithium secondary battery is obtained.

The present invention will be described in greater detail with reference to the following examples. The following examples are for illustrative purposes and are not intended to limit the scope of the invention.

EXAMPLE 1

99% by weight of an organic solvent containing 50% by volume of ethylene carbonate, 50% by volume of propylene carbonate, and 1% by weight of diethyl vinyl phosphonate (DEVP) were mixed together, and lithium salt $LiPF_5$ was added into the mixture to prepare 1.15 M organic electrolytic solution.

A two-electrode battery having a Li metal cathode (2.5×4 $cm^2$) and an artificial graphite anode (1×1 $cm^2$) having a small specific surface area of about 2.5 $m^2/g$ was manufactured using the organic electrolytic solution. The electrical characteristics of the two-electrode battery were measured three times using cyclic voltammetry (CV) at a scan rate of 1 mV/sec in the range of 0.0–2.5V and were compared with a reference electrode.

EXAMPLE 2

A two-electrode battery was manufactured in the same manner as in Example 1, except that a mixture of 95% by weight of the organic solvent containing 50% by volume of ethylene carbonate, 50% by volume of propylene carbonate, and 5% by weight of DEVP was used for the organic electrolytic solution. The electrical characteristics of the battery were measured using CV.

EXAMPLE 3

A two-electrode battery was manufactured in the same manner as in Example 1, except that a mixture of 93% by weight of the organic solvent containing 50% by volume of ethylene carbonate, 50% by volume of propylene carbonate, and 7% by weight of DEVP was used for the organic electrolytic solution. The electrical characteristics of the battery were measured using CV.

EXAMPLE 4

A two-electrode battery was manufactured in the same manner as in Example 1, except that a mixture of 90% by weight of the organic solvent containing 50% by volume of ethylene carbonate, 50% by volume of propylene carbonate, and 10% by weight of DEVP was used for the organic electrolytic solution. The electrical characteristics of the battery were measured using CV.

EXAMPLE 5

A two-electrode battery was manufactured in the same manner as in Example 1, except that an artificial graphite anode having a larger specific surface area of about 4 $m^2/g$ was used instead of the small specific surface area graphite anode. The same electrolytic solution as used in Example 1, which included 99% by weight of the organic solvent containing 50% by volume of ethylene carbonate, 50% by volume of propylene carbonate, and 1% by weight of DEVP, was used. The electrical characteristics of the battery were measured using CV.

EXAMPLE 6

A two-electrode battery was manufactured in the same manner as in Example 1, except that a mixture of 95% by weight of the organic solvent containing 50% by volume of ethylene carbonate, 50% by volume of propylene carbonate, and 5% by weight of DEVP was used for the organic electrolytic solution, and an artificial graphite anode having a larger specific surface area of about 4 $m^2/g$ was used instead of the small specific surface area graphite anode. The electrical characteristics of the battery were measured using CV.

EXAMPLE 7

A two-electrode battery was manufactured in the same manner as in Example 1, except that a mixture of 93% by weight of the organic solvent containing 50% by volume of ethylene carbonate, 50% by volume of propylene carbonate, and 7% by weight of DEVP was used for the organic electrolytic solution, and an artificial graphite anode having a larger specific surface area of about 4 $m^2/g$ was used instead of the small specific surface area graphite anode. The electrical characteristics of the battery were measured using CV.

COMPARATIVE EXAMPLE 1

A two-electrode battery was manufactured in the same manner as in Example 1, except that no DEVP was added in the preparation of the organic electrolytic solution. The electrical characteristics of the battery were measured using CV.

COMPARATIVE EXAMPLE 2

A two-electrode battery was manufactured in the same manner as in Comparative Example 1, except that a larger specific surface area graphite anode was used instead of the small specific surface area graphite anode. The electrical characteristics of the battery were measured using CV.

COMPARATIVE EXAMPLE 3

A two-electrode battery was manufactured in the same manner as in Example 1, except that a mixture of 98% by weight of the organic solvent containing 50% by volume of ethylene carbonate, 50% by volume of propylene carbonate, and 2% by weight of vinylene carbonate was used for the organic electrolytic solution, instead of the electrolytic solution including 99% by weight of the organic solvent containing 50% by volume of ethylene carbonate, 50% by volume of propylene carbonate, and 1% by weight of DEVP. The electrical characteristics of the battery were measured using CV.

COMPARATIVE EXAMPLE 4

A two-electrode battery was manufactured in the same manner as in Comparative Example 3, except that a larger specific surface area graphite anode was used instead of the small specific surface area graphite anode. The electrical characteristics of the battery were measured using CV.

The electrical characteristics of the two-electrode batteries manufactured in Examples 1 through 7 and Comparative Examples 1 through 4, which were measured using CV, are shown in FIGS. 1 through 11, respectively.

As shown in FIGS. 1 through 4, which are cyclic voltammograms for the batteries manufactured in Examples 1 through 4, respectively, the electrolytic solution of the batteries decompose less in the range of 0.5–1V compared to lithium, and the first cycle irreversible capacities of the batteries decrease. The larger the amount of DEVP, the more the decomposition of the electrolyte is suppressed, particularly when about 5–7% by weight of DEVP is used.

Figure 8:
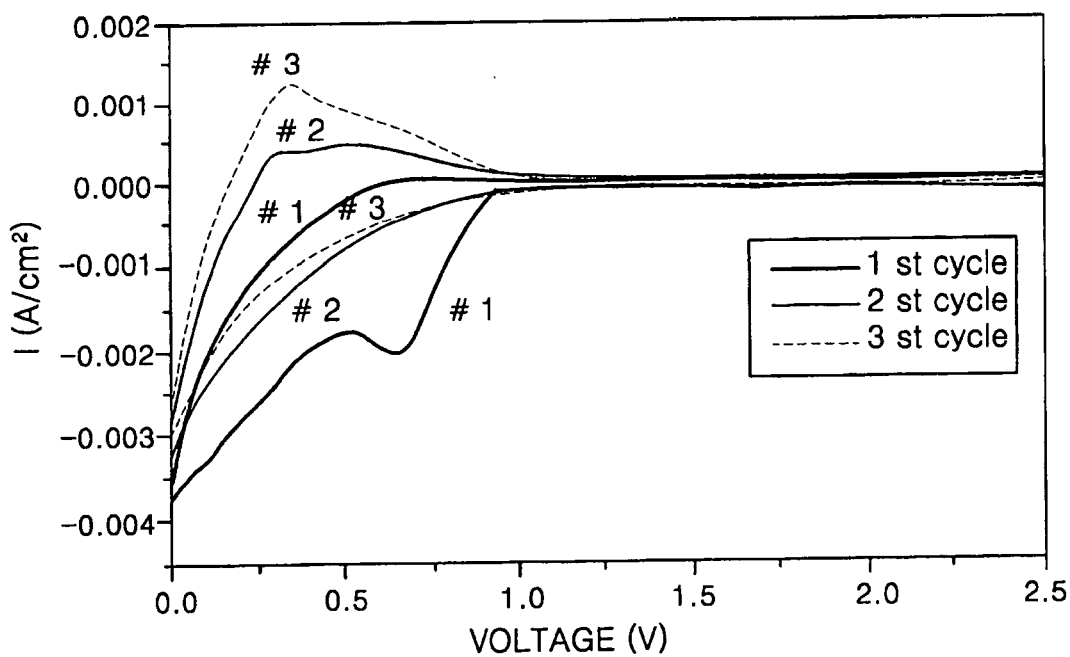
FIGS. 8 through 11 are graphical representations of electrical characteristics for batteries of Comparative Examples 1 through 4, which were measured using CV.

Referring to FIG. 8, which is a cyclic voltammogram for the battery of Comparative Example 1, the electrolyte decomposes abruptly during the first cycle in the range of 0.5–1V, compared to lithium, thus increasing the irreversible capacity. The charging/discharging capacity apparently decreases during the second and third cycles.

Figure 9:
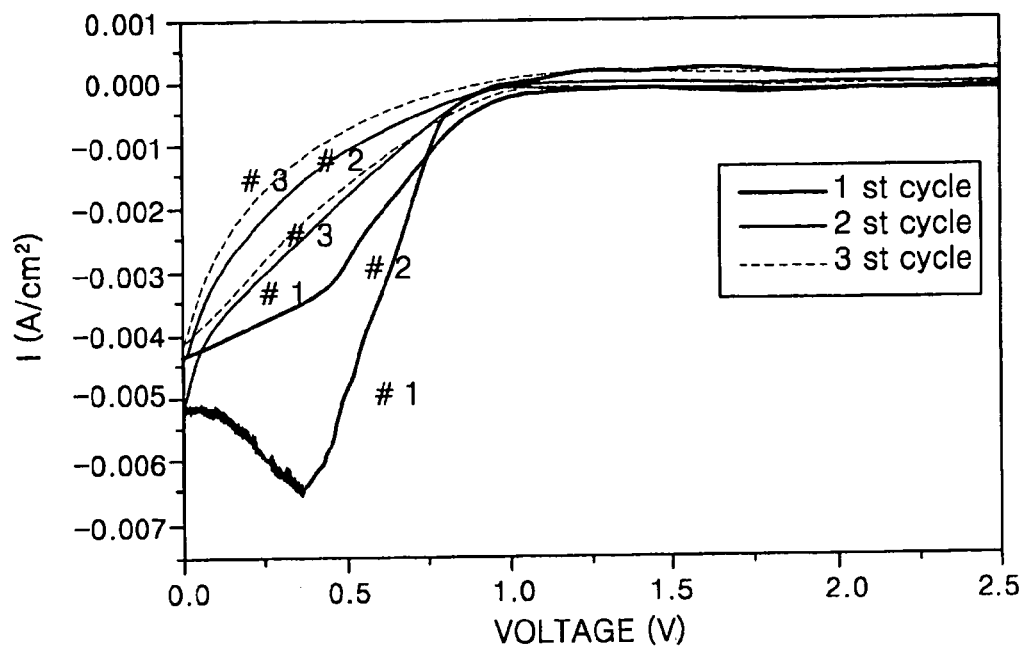

Referring to FIG. 9, which is a cyclic voltammogram for the battery of Comparative Example 2, the decomposition of the electrolytic solution is more serious than that of the battery of Comparative Example 1 in FIG. 8, and thus the charging/discharging capacity of lithium ions considerably decreases. The serious decomposition of the electrolytic solution is considered to be attributed to the larger specific surface area of the anode material providing more reaction sites. The decomposition of the electrolytic solution during the first cycle increases the irreversible capacity and leads to a sharp reduction in charging/discharging efficiency during the second and third cycles.

Figure 5:
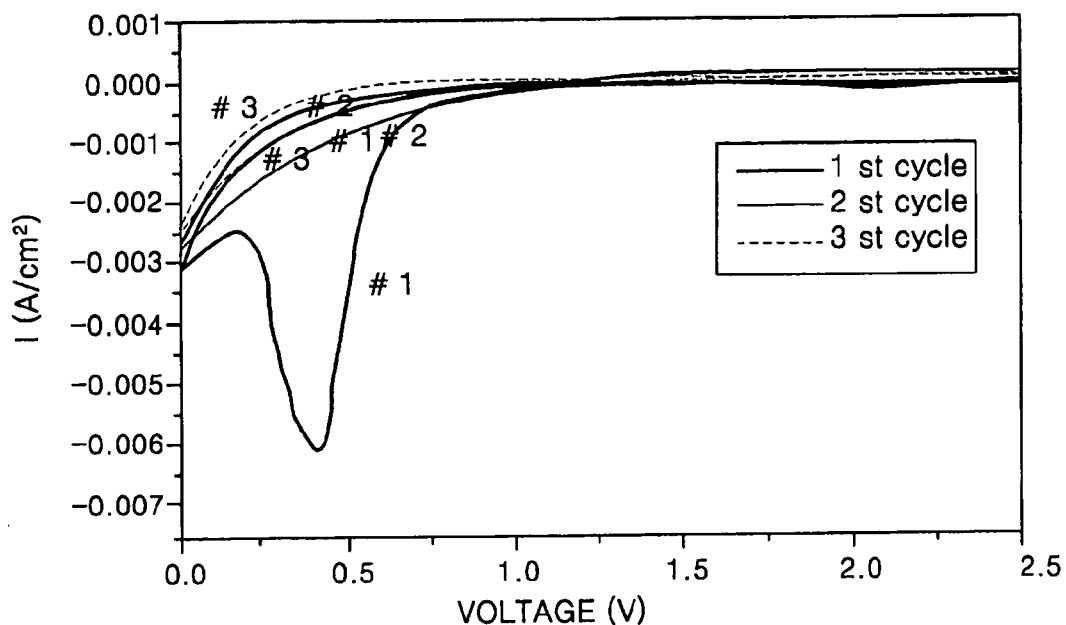
Figure 6:
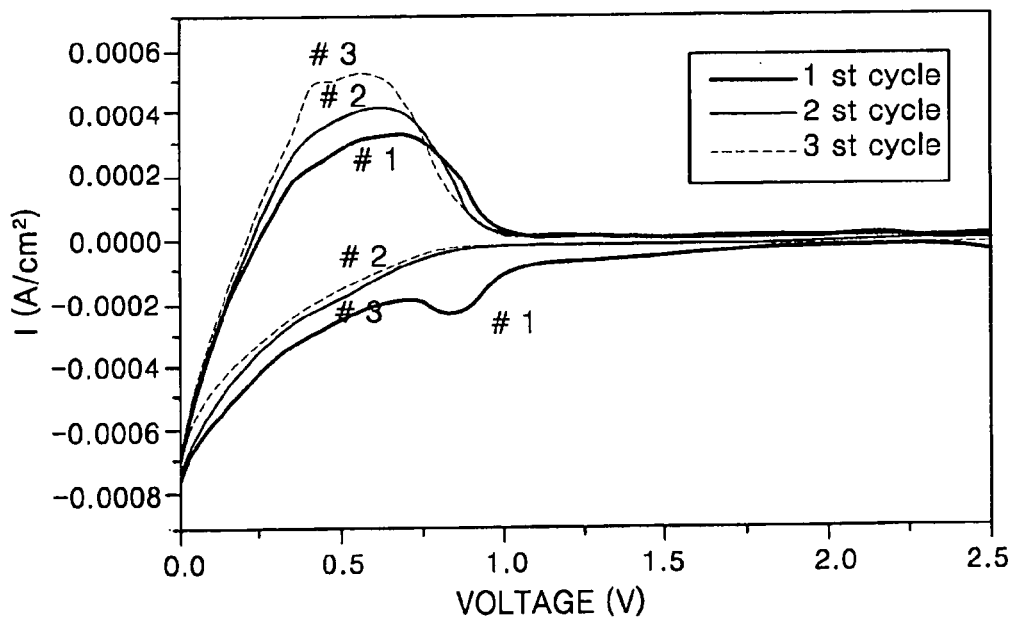
Figure 7:
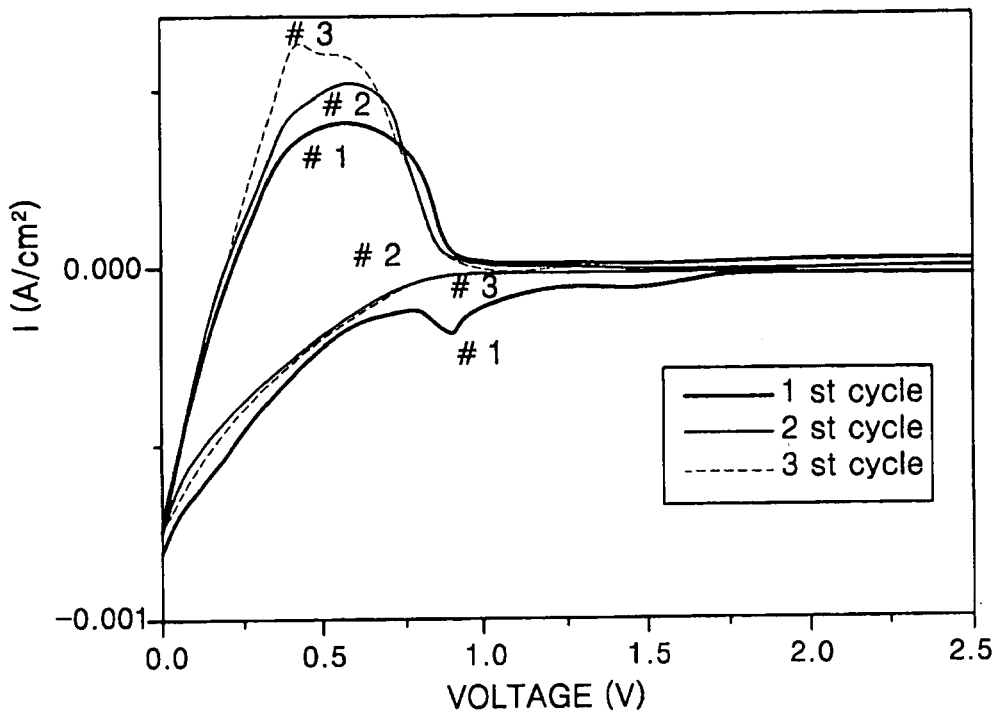

Referring to FIGS. 5 through 7, which are cyclic voltammograms for the batteries of Examples 5 through 7, respectively, the larger the amount of DEVP, the more stable the formation of a solid electrolyte interface (SEI) on the anode during the first cycle, the smaller the first cycle irreversible capacity, and the greater the charging/discharging efficiency.

Figure 10:
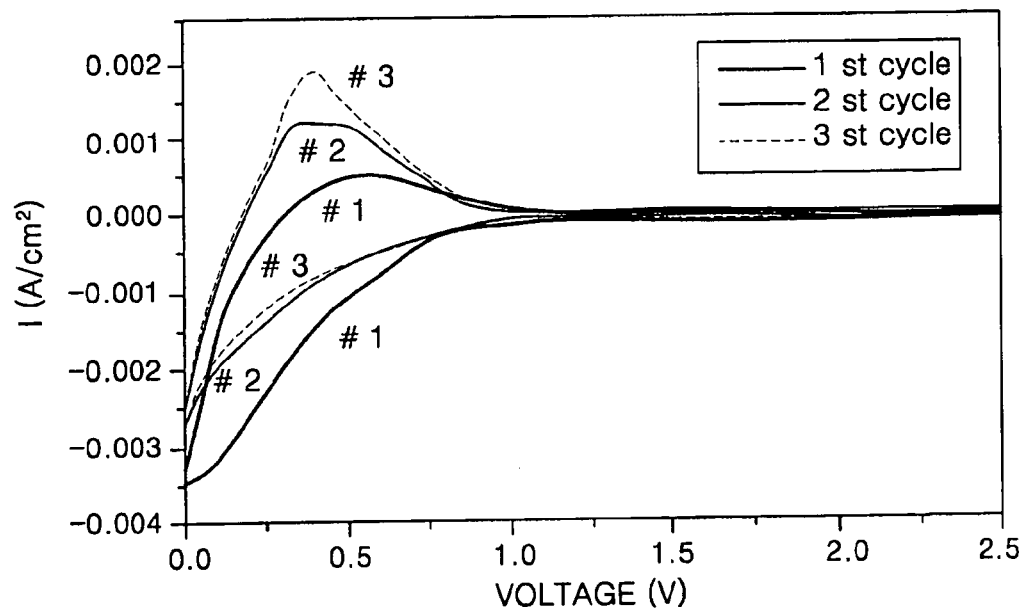
Figure 11:
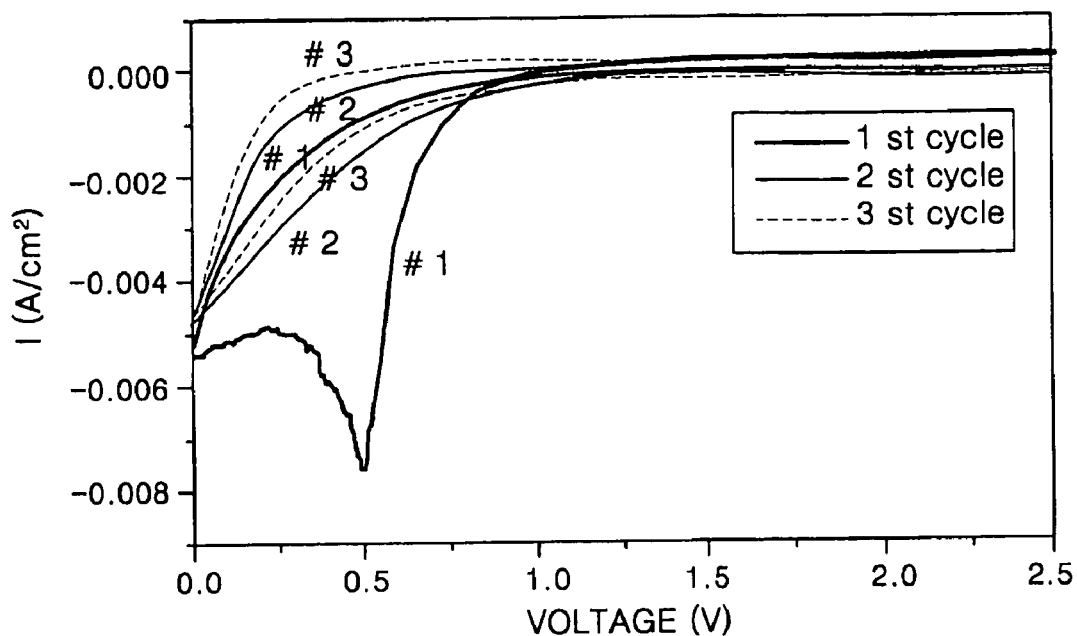

In addition, as is apparent from FIGS. 10 and 11, which are cyclic voltammograms for the batteries of Comparative Examples 3 and 4, respectively, when using conventional vinyl carbonate, the first cycle irreversible capacity greatly increases compared to using DEVP

EXAMPLE 8

A lithium secondary battery was manufactured as follows using the organic electrolytic solution prepared in Example 1.

96% by weight of $LiCoO_2$, 2% by weight of polyvinylidenefluoride (PVdF) as a binder, and 2% by weight of a carbon black were mixed together, and 100 mL of N-methylpyrrolidone (NMP) and ceramic balls were added into the mixture and thoroughly mixed in a 200-mL plastic bottle for about 10 hours. A cathode was cast from the mixture on a 15 µm-thick aluminium thin film using a 250 µm-spaced doctor blade, dried in an oven at 110° C. for about 12 hours to fully evaporate the NMP, and roll pressed to a thickness of 95 µm.

96% by weight of graphite powder as an anode active material, 4% by weight of PVdF, and NMP were mixed together, and ceramic balls were added into the mixture and thoroughly mixed for about 10 hours. An anode was cast from the mixture on a 19 µm-thick copper thin film using a 300 µm-spaced doctor blade, dried in an oven at 90° C. for about 10 hours to fully evaporate the NMP, and roll pressed to a thickness of 120 µm.

A micro-porous, 20 µm-thick polyethylene-polypropylene membrane (available from HOEST CELANESE Colo., U.S.A.) was used as a separator.

The separator was interposed between the cathode and the anode manufactured through the above processes and then wound by a jelly-roll method to form an electrode assembly. The electrode assembly was injected into a battery case, and then the resultant was pressed and sealed in a battery case.

An organic electrolytic solution was prepared by adding 1% by weight of DEVP into 99% by weight of an organic solvent containing 30% by volume of ethylene carbonate, 10% by volume of dimethyl carbonate, 50% by volume of ethyl methyl carbonate, and 10% by volume of fluorobenzene. The organic electrolytic solution was injected into the battery case accommodating the electrode assembly to manufacture a complete lithium secondary battery.

COMPARATIVE EXAMPLE 5

A lithium secondary battery was manufactured in the same manner as in Example 8, except that a mixture of 1% by weight of dimethyl methyl phosphonate and 99% by weight of the organic solvent containing 30% by volume of ethylene carbonate, 10% by volume of dimethyl carbonate, 50% by volume of ethyl methyl carbonate, and 10% by volume of fluorobenzene was used for the organic electrolytic solution.

COMPARATIVE EXAMPLE 6

A lithium secondary battery was manufactured in the same manner as in Example 8, except that a mixture of 1% by weight of diethyl methyl phosphonate and 99% by weight of the organic solvent containing 30% by volume of ethylene carbonate, 10% by volume of dimethyl carbonate, 50% by volume of ethyl methyl carbonate, and 10% by volume of fluorobenzene was used for the organic electrolytic solution.

COMPARATIVE EXAMPLE 7

A lithium secondary battery was manufactured in the same manner as in Example 8, except that the organic solvent containing 30% by volume of ethylene carbonate, 10% by volume of dimethyl carbonate, 50% by volume of ethyl methyl carbonate, and 10% by volume of fluorobenzene was exclusively used for the organic electrolytic solution without an additive.

COMPARATIVE EXAMPLE 8

A lithium secondary battery was manufactured in the same manner as in Example 8, except that a mixture of 2% by weight of vinyl carbonate and 98% by weight of the organic solvent containing 30% by volume of ethylene carbonate, 10% by volume of dimethyl carbonate, 50% by volume of ethyl methyl carbonate, and 10% by volume of fluorobenzene was used for the organic electrolytic solution.

The degree of swelling after initial charging and the degree of swelling after 50 charging/discharging cycles were measured using the lithium secondary batteries manufactured in Example 8 and Comparative Examples 5 through 8. Initial charging was performed at a current of 0.2 C, and 50 charging/discharging cycles were performed at a charging current rate of 1 C and a discharging current rate of 1 C. The degree of swelling of each electrode assembly was determined by measuring variations in the thickness of the electrode assembly.

Variations in the thickness of each of the electrolyte assemblies after initial charging are shown in Table 1.

TABLE 1

| Example | Variation in Thickness (mm) |
| --- | --- |
| Example 8 | 0.55 |
| Comparative Example 5 | 0.61 |
| Comparative Example 6 | 0.67 |
| Comparative Example 7 | 0.9 |
| Comparative Example 8 | 0.74 |

As is apparent from Table 1, the degree of swelling of the electrode assembly after initial charging is smaller for the lithium battery of Example 8 than for the lithium batteries of Comparative Examples 5 through 8.

Variations in the thickness of each of the electrolyte assemblies after 50 charging/discharging cycles are shown in Table 2.

TABLE 2

| Example | Variation in Thickness (mm) |
| --- | --- |
| Example 8 | 0.56 |
| Comparative Example 5 | 0.63 |
| Comparative Example 6 | 0.68 |
| Comparative Example 7 | 0.91 |
| Comparative Example 8 | 0.75 |

As is apparent from Table 2, the degree of swelling of the electrode assembly after 50 cycles is still smaller for the lithium battery of Example 8 than for the lithium batteries of Comparative Examples 5 through 8.

Figure 12:
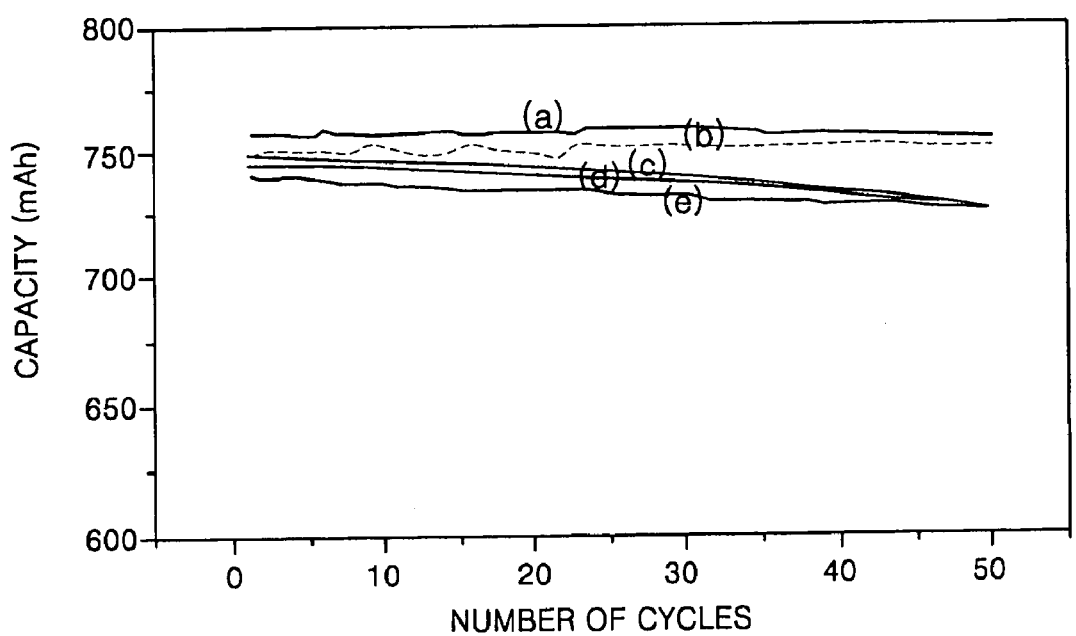
FIG. 12 is a graphical representation of long-term cycling characteristics for batteries of Example 8 and Comparative Examples 5 through 8.

As is apparent from FIG. 12, the long-term performance of the lithium secondary battery of Example 8, which was measured after 50 charging/discharging cycles, appears to be superior to that of the lithium secondary batteries of Comparative Examples 5 through 8. In FIG. 12, (a) refers to the lithium secondary battery containing DEVP (Example 8), (b)) refers to the lithium secondary battery containing vinyl carbonate (Comparative Example 8), (c)) refers to the lithium secondary battery containing diethyl dimethyl phosphonate (Comparative Example 6), (d)) refers to the lithium secondary battery containing dimethyl methyl phosphonate (Comparative Example 5), and (e)) refers to the lithium secondary battery containing no additive (Comparative Example 7).

When using an organic electrolyte containing the phosphonate compound of formula (1) according to the present invention to manufacture a lithium secondary battery, the lithium secondary battery has improved stability to reductive decomposition, reduced first cycle irreversible capacity, and improved charging/discharging efficiency and lifespan. In addition, the lithium secondary battery does not swell beyond a predetermined thickness range after formation and standard charging at room temperature and has improved reliability. Even when the lithium secondary battery swells seriously at a high temperature, its capacity is high enough for practical applications. The capacity of the lithium secondary battery may be effectively recovered after being left at a high temperature.

Figure 13:
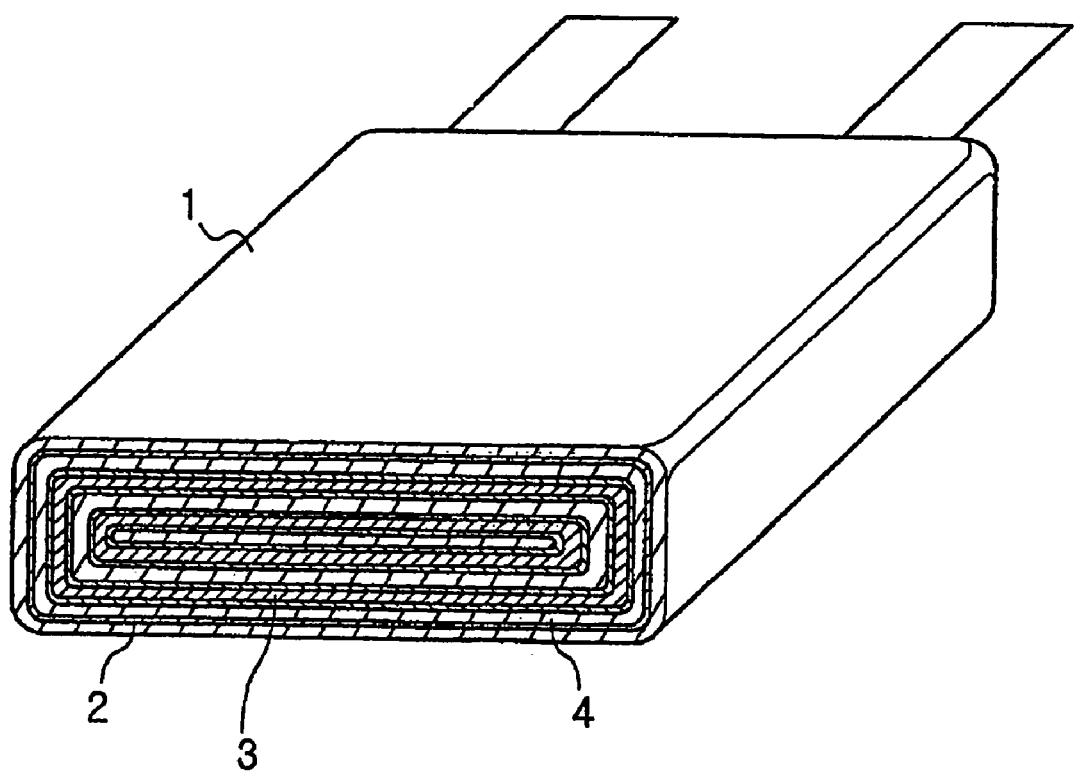
FIG. 13 is a perspective view showing one embodiment of a lithium secondary battery in accordance with the present invention.

FIG. 13 is a perspective view showing one embodiment of a lithium battery 1 in accordance with the present invention. An anode 3, a cathode 4 and a separator 2 interposed between the anode 3 and the cathode 4 are rolled/folded together and inserted into a battery case, and the organic electrolytic solution (not shown) is injected into the battery case to obtain the lithium secondary battery.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An organic electrolytic solution comprising a lithium salt, an organic solvent, and a phosphonate compound of formula (1) below:

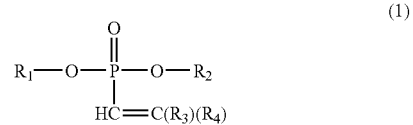

(1)

wherein $R_1$ and $R_2$ are independently selected from among a substituted or unsubstituted $C_1$–$C_{20}$ alkyl group, a substituted or unsubstituted $C_1$–$C_{20}$ alkoxy group, a substituted or unsubstituted $C_2$–$C_{20}$ alkenyl group, a substituted or unsubstituted $C_6$–$C_{30}$ aryl group, a substituted or unsubstituted $C_7$–$C_{30}$ aralkyl group, a substituted or unsubstituted aryloxy group, a substituted or unsubstituted $C_2$–$C_{30}$ heteroaryl group, a substituted or unsubstituted $C_3$–$C_{30}$ heteroaralkyl group, a substituted or unsubstituted $C_2$–$C_{30}$ heteroaryloxy group, a substituted or unsubstituted $C_5$–$C_{20}$ cycloalkyl group, and a substituted or unsubstituted $C_2$–$C_{20}$ heterocycloalkyl group; and $R_3$ and $R_4$ are independently selected from among a hydrogen atom and a substituted or unsubstituted $C_1$–$C_{20}$ alkyl group.

2. The organic electrolytic solution of claim 1, wherein an amount of the phosphonate compound of said formula (1) is in a range of 0.1–50% by weight with respect to 50–99.9% by weight of the organic solvent.

3. The organic electrolytic solution of claim 1, wherein the phosphonate compound of said formula (1) is at least one of diethyl vinyl phosphonate and dimethyl vinyl phosphonate.

4. The organic electrolytic solution of claim 1, wherein the organic solvent comprises a high dielectric constant solvent and a low boiling point solvent.

5. The organic electrolytic solution of claim 4, wherein the high dielectric constant solvent is at least one selected from the group consisting of ethylene carbonate, propylene carbonate, butylene carbonate, and γ-butyrolactone, and an amount of the high dielectric constant solvent is in a range of 10–90% by volume based on a total volume of the organic solvent.

6. The organic electrolytic solution of claim 4, wherein the low boiling point solvent is at least one selected from the group consisting of dimethyl carbonate, ethyl methyl carbonate, diethyl carbonate, dipropyl carbonate, dimethoxyethane, $C_1$–$C_{13}$ fatty acid ester derivatives, and an amount of the low boiling point solvent is in a range of 10–90% by volume based on a total volume of the organic solvent.

7. The organic electrolytic solution of claim 1, wherein a concentration of the lithium salt is in a range of 0.5–2.0 M.

8. A lithium battery comprising:
a cathode;
an anode;
a separator interposed between the cathode and the anode; and
an organic electrolytic solution comprising a lithium salt, an organic solvent and a phosphonate compound of formula (1) below:

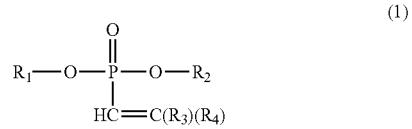

wherein $R_1$ and $R_2$ are independently selected from among a substituted or unsubstituted $C_1$–$C_{20}$ alkyl group, a substituted or unsubstituted $C_1$–$C_{20}$ alkoxy group, a substituted or unsubstituted $C_2$–$C_{20}$ alkenyl group, a substituted or unsubstituted $C_6$–$C_{30}$ aryl group, a substituted or unsubstituted $C_7$–$C_{30}$ aralkyl group, a substituted or unsubstituted aryloxy group, a substituted or unsubstituted $C_2$–$C_{30}$ heteroaryl group, a substituted or unsubstituted $C_3$–$C_{30}$ heteroaralkyl group, a substituted or unsubstituted $C_2$–$C_{30}$ heteroaryloxy group, a substituted or unsubstituted $C_5$–$C_{20}$ cycloalkyl group, and a substituted or unsubstituted $C_2$–$C_{20}$ heterocycloalkyl group; and $R_3$ and $R_4$ are independently selected from among a hydrogen atom and a substituted or unsubstituted $C_1$–$C_{20}$ alkyl group.

9. The lithium battery of claim 8, wherein the cathode contains at least one selected from the group consisting of lithium composite oxide, single substance sulfur, kasolite comprising $Li_2S_n$ where $n \geq 1$, organo-sulfur, and $(C_2S_x)_y$ where x ranges from 2.5 to 20 and $y \geq 2$.

10. The lithium battery of claim 8, wherein the anode is selected from the group consisting of a lithium metal electrode, a lithium-metal alloy electrode, a lithium-inert sulfur composite electrode, a carbonaceous electrode, and a graphite electrode.

11. The lithium battery of claim 8, wherein an amount of the phosphonate compound of said formula (1) is in a range of 0.1–50% by weight with respect to 50–99.9% by weight of the organic solvent.

12. The lithium battery of claim 8, wherein the phosphonate compound of said formula (1) is at least one of diethyl vinyl phosphonate and dimethyl vinyl phosphonate.

13. The lithium battery of claim 8, wherein the organic solvent comprises a high dielectric constant solvent and a low boiling point solvent.

14. The lithium battery of claim 8, wherein the high dielectric constant solvent is at least one selected from the group consisting of ethylene carbonate, propylene carbonate, butylene carbonate, and γ-butyrolactone, and an amount of the high dielectric constant solvent is in a range of 10–90% by volume based on a total volume of the organic solvent.

15. The lithium battery of claim 8, wherein the low boiling point solvent is at least one selected from the group consisting of dimethyl carbonate, ethyl methyl carbonate, diethyl carbonate, dipropyl carbonate, dimethoxyethane, $C_1$–$C_{13}$ fatty acid ester derivatives, and an amount of the low boiling point solvent is in a range of 10–90% by volume based on a total volume of the organic solvent.

16. The lithium battery of claim 8, wherein a concentration of the lithium salt is in a range of 0.5–2.0 M.

17. The lithium battery of claim 9, wherein the lithium composite oxide is selected from the group consisting of $LiCoO_2$, $LiMn_xO_{2x}$, $LiNi_{1-x}Mn_xO_2$, where x=1 or 2, and $Ni_{1-x-y}Co_xMn_yO_2$.

18. The lithium battery of claim 8, wherein the separator comprises a glass fiber, polyester, polyethylene, polypropylene, polytetrafluoroethylene, or any combination thereof.

19. The lithium battery of claim 8, wherein the separator is formed by:
mixing a polymer resin, a filling agent and a solvent to form a separator composition; and
one of:
coating the separator composition on an electrode to form the separator; and
casting the separator composition on a support, drying to form a separator film and laminating the electrode with the separator film,
wherein the polymer resin is a vinylidenefluoride-hexafluoropropylene copolymer containing 8–25% by weight of hexafluoropropylene.

20. The lithium battery of claim 8, wherein the lithium battery comprises an electrode assembly that comprises the cathode, the anode, and the separator rolled/folded together and sealed into a battery case, wherein the organic electrolytic solution is injected into the battery case.

* * * * *